J01. LAND VEHICLES
WHEELS & AXLES.
77
BEST AVAILABLE COPY

R. M. McClelland,
Hub.

No. 4322. Reissued. Apl. 4. 1871.

Witnesses:
A. E. Rawlings.
Victor Hagmann

Inventor:
R. M. McClelland
By Hill & Ellsworth
Attys.

BEST AVAILABLE COPY

United States Patent Office.

ROBERT W. McCLELLAND, OF SPRINGFIELD, ILLINOIS.

Letters Patent No. 99,691, dated February 8, 1870; reissue No. 4,322, dated April 4, 1871.

IMPROVEMENT IN CARRIAGE-WHEELS.

The Schedule referred to in these Letters Patent and making part of the same.

*To all whom it may concern:*

Be it known that I, ROBERT W. McCLELLAND, of Springfield, in the county of Sangamon and State of Illinois, have invented certain Improvements in Carriage-Wheels; and I declare the following to be a full, clear, and exact description thereof, reference being had to the accompanying drawing, in which—

Similar letters of reference indicate like parts in the several drawings.

Figure 1:
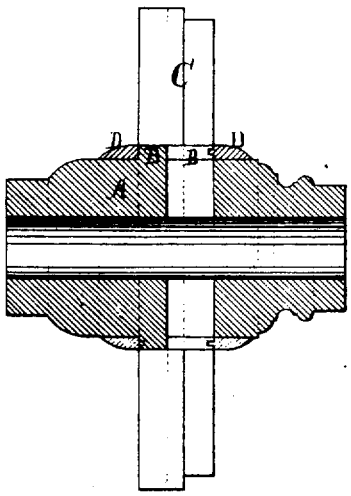
Figure 1 is an axial section.

This invention relates to that class of carriage-wheels in which a wooden hub is used in connection with a metallic band or ring encircling it on each side of the row of spokes, for the purpose of strengthening the hub and supporting the spokes; and It consists—

First, in the employment of a "raised center" upon the hub in combination with said rings and with dodged spokes; and Secondly, in a peculiar construction of the spoke-tenons and hub-mortises, by means of which great strength and durability are imparted to the wheel at that point, and the consequences of the spokes wearing in their sockets are obviated to a great degree.

In the drawing—

Figure 4:
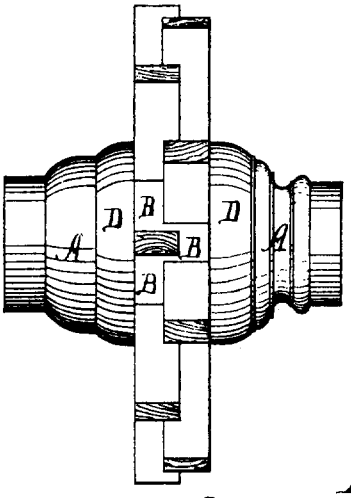
Figure 4 is a side view of the hub, showing the arrangement of the "dodged" spokes and the bands.

A represents the hub, of any ordinary shape and construction, except that around it, about midway between its extremities, a portion, B, is raised so as to afford a longer bearing for the spokes C, which are tenoned therein in two rows, as shown in fig. 4, and alternate with each other, in the manner known as dodged or "staggered," the outer edge of the spokes in each row being about flush with the edge of the raised ring or center B on that side.

D D are metal bands fitted around the hub on the outer sides of the spokes, with their inner edges bearing against the spokes and against the vertical sides of the raised center B, and their convex surface flush with that of the center thus inclosed between them.

The bands are secured upon the hub in any suitable manner, and, if preferred, they may be made with projections, *d d*, on their inner edges, adapted to fit into openings, *x x*, in the sides of the spokes, for the purpose of holding the latter more firmly in place.

Figure 3:
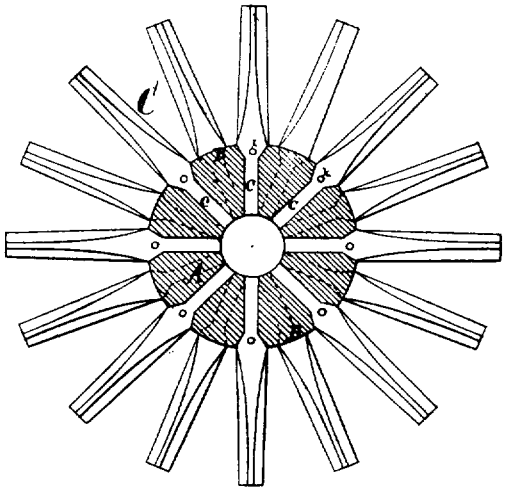
Figure 3 is a cross-section of the wheel.
Figure 2:
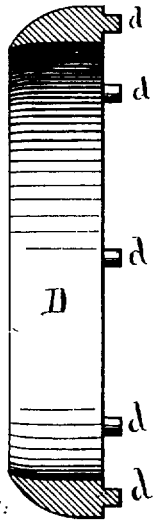
Figure 2 is a section of the metal band when provided with projections.

The inner ends of the spokes C are provided with the usual straight tenons, *c*, but the shoulders thereof, instead of being square or at right angles to said tenons, are sloped or beveled outward and upward, preferably at an angle of about forty-five degrees, as shown in fig. 3.

The mortise in the raised center corresponds in size and shape with the tenons and beveled shoulders of the spokes, so that, when the latter are placed therein, the upper edges of said shoulders become flush with the periphery of said raised center.

The raised center, in combination with the bands and the two rows of spokes, arranged as described, constitutes, perhaps, the most substantial and durable hub yet brought before the public.

The operation of the several parts is as follows:

The raised center gives a longer bearing surface for the tenons, causing the hub to hold them with more tenacity and to support a greater length of the spoke.

The wood of the hub, being somewhat elastic, grasps and holds the spokes much more firmly than is possible for an iron hub, and permits them to be driven into the mortise more tightly.

The iron bands keep the wood from splitting, and also serve to brace and support the sides of the spokes.

The dodging of the spokes causes them to brace from each side of the central line, forming an arch for the support of the fellies, so that, when the tires are shrunk on, they will not cause the wheel to "dish." It also prevents the mortises from coming in a continuous line, so that each tenon is surrounded and supported by a thick, strong wall of wood on three sides, and a wall of wood and metal on the fourth side.

The peculiar construction of the tenons and beveled shoulders, in connection with the mortises, as above described, greatly increases the strength of the spokes, and renders their heretofore weakest part (the point of union with the hub) the strongest, as, by the angular form of the shoulders and the corresponding shape of the mortises, an arch is formed of said hub and spokes, each part of which supports and gives strength to the other.

In addition to this advantage the beveling of the shoulders enables them to wedge more firmly into the mortises when the tire is reset, so that, if some of them have worn a little, they are not thereby left loose, but every joint is tightened up and made as firm and staunch as when the wheel was new. In fact the bearing surfaces at this point cannot so wear away that they will not at once fit together again and form a perfect joint the moment that the tire is reset.

Having thus described my invention,

What I desire to secure by Letters Patent is—

1. The combination of a wooden hub having a raised center with dodged spokes and metal bands, substantially as and for the purposes set forth.

2. The combination of the hub A, provided with the raised center B, the spokes C C, and the bands D D provided with the pins or studs *d d*, substantially as and for the purpose herein set forth.

ROBERT W. McCLELLAND.

Witnesses:

E. B. BINCE,

T. C. MATHER.